June 28, 1960    L. B. DE LONG ET AL    2,942,425
MOBILE DRY DOCK METHOD AND APPARATUS
Filed Sept. 28, 1956    9 Sheets-Sheet 1

INVENTORS:
Leon B. DeLong,
George E. Suderow,
BY Cushman Darby & Cushman
ATTORNEYS.

June 28, 1960  L. B. DE LONG ET AL  2,942,425
MOBILE DRY DOCK METHOD AND APPARATUS
Filed Sept. 28, 1956  9 Sheets-Sheet 2

INVENTORS:
Leon B. DeLong,
George E. Suderow.
BY Cushman Darby & Cushman
ATTORNEYS.

June 28, 1960  L. B. DE LONG ET AL  2,942,425
MOBILE DRY DOCK METHOD AND APPARATUS
Filed Sept. 28, 1956  9 Sheets-Sheet 4

INVENTORS:
Leon B. DeLong,
George E. Suderow,
BY Cushman Darby & Cushman
ATTORNEYS.

June 28, 1960 L. B. DE LONG ET AL 2,942,425
MOBILE DRY DOCK METHOD AND APPARATUS
Filed Sept. 28, 1956 9 Sheets-Sheet 9

INVENTORS:
Leon B. DeLong,
George E. Suderow,
BY Cushman Darby & Cushman
ATTORNEYS.

United States Patent Office 2,942,425
Patented June 28, 1960

2,942,425

MOBILE DRY DOCK METHOD AND APPARATUS

Leon B. De Long, Seattle, Wash., and George E. Suderow, New York, N.Y., assignors to De Long Corporation, New York, N.Y., a corporation of Delaware Filed Sept. 28, 1956, Ser. No. 612,807

12 Claims. (Cl. 61—46.5)

This invention relates to convertible working platform barges and more particularly to the utilization of such barges as a tender or dry dock for marine craft.

The use of a floating platform provided with a plurality of guide means such as vertical openings or the like for receiving a corresponding series of elongated supporting legs has been known for some years. With this arrangement, jacking mechanisms are provided on the platform for the supporting legs to permit the same to be moved down into the marine bottom after the platform has been towed to a suitable site of erection. The jacking mechanisms are operable to move the lower ends of the supporting legs to a firm foundation in the marine bottom and to subsequently raise the entire platform on the supporting legs to a suitable height above the water level. The platform thus stationarily mounted above the body of water can be permanently or temporarily utilized for a variety of purposes. For example, platforms of this nature have been temporarily used for off-shore drilling operations. Another use of platforms of this type is to provide permanent radar stations at strategic points along the coast. Still another use of this type of platform is in providing a permanent bridge or pier which can be quickly erected in any chosen site.

The present invention embodies some of the general principles set forth in the above-described arrangement for use as a dry dock for marine craft. Basically, the present invention constitutes an improvement on the disclosure set forth in copending application Serial No. 460,598, filed October 6, 1954, by George E. Suderow. In this application there is disclosed a convertible working platform barge of the type described which includes a pair of vertically stacked platform-like bodies mounted for vertical movement with respect to each other. The upper platform-like body serves to perform the same function as the usual platform of the basic system, while the lower platform-like body serves to provide lateral stability for the supporting legs of the upper platform and thus strengthen the mounting of the same.

The present application also includes the provision of a pair of vertically stacked platform-like bodies in which the upper body is utilized as a storage and working area, but in which the lower platform is utilized as a means for raising marine craft into a dry dock position above the level of the water so that the same can be serviced and repaired.

Accordingly, it is an object of the present invention to provide a marine craft dry dock which is effective to handle large marine craft and which is easily movable from one location to another, but yet in operation is firmly supported on the marine bottom and maintained above the water level thereof.

Another object of the present invention is the provision of a floating dry dock of the type described which may be self-propelled from one location to another and upon reaching a desired location may be secured to the marine bottom in a position above the water level thereof.

Still another object of the present invention is the provision of a floating dry dock of the type described having improved means for receiving marine craft and for raising the same to a dry dock position for maintenance and repairs.

Still another object of the invention is the provision of a novel method of erecting a marine craft dry dock which may be quickly erected in any desired location in which the marine bottom is disposed below the water level a predetermined distance or less.

Still another object of the invention is the provision of a method of the type described embodying novel procedure for receiving marine craft and elevating the same to a dry dock position above the surrounding water level.

These and other objects of the present invention will become more apparent during the course of the following detailed description and appended claims.

The invention may best be understood with reference to the accompanying drawings wherein an illustrative embodiment is shown.

Referring now more particularly to the drawings, there is shown in Figures 1–7 a mobile marine craft dry dock assembly, generally indicated at 10, which embodies the principles of the present invention. The assembly 10, in general, includes an upper working platform 12 and a lower marine craft receiving and supporting platform 14. These platforms are mounted in vertical alignment with each other and have a plurality of elongated supporting legs, generally indicated at 16, arranged to extend therethrough. A corresponding series of jacking mechanisms, generally indicated at 18, are mounted on the lower platform for engagement with the supporting legs so as to effect relative vertical movement between the platforms and the supporting legs. The platforms are mounted for relative vertical movement with respect to each other and to the supporting legs between an operative position and a transporting position wherein the platforms are disposed in engagement with each other so as to form a bouyant marine vessel. Preferably the lower platform is provided with propelling means, as generally indicated at 20, which is utilized to propell the assembly in its transporting position to a suitable marine site. In its transporting position the upper and lower platforms of the assembly cooperate to define a suitable marine craft shape sufficient to permit the same to travel along a body of water in the conventional manner. When the assembly has been transported to a suitable site, the platforms are movable vertically relative to each other and to the supporting legs from the transporting position to the operative dry dock position wherein the upper platform is maintained at a desired height above the water level by the supporting legs and the lower platform is movable on the supporting legs between a submerged position for receiving marine craft and dry dock position above the water level.

Figure 1:
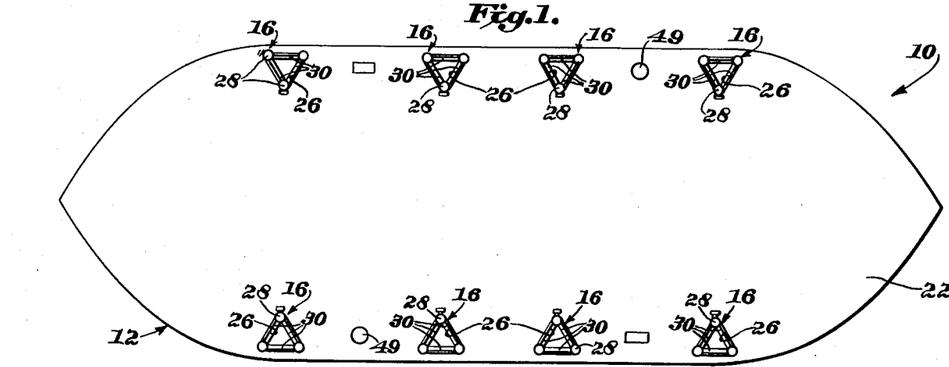
Figure 1 is a top plan view of a mobile marine craft dry dock assembly embodying the principles of the present invention.
Figure 3:
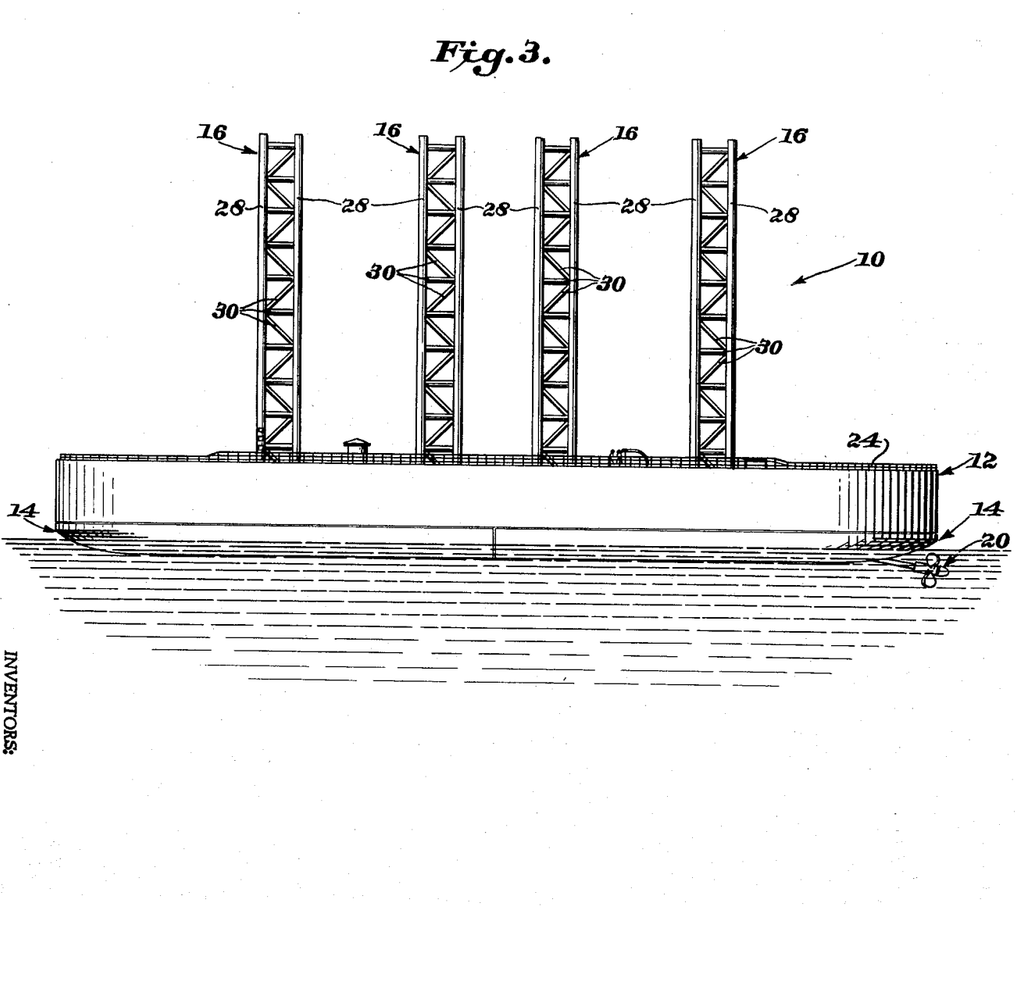
Figure 3 is a side elevational view of the assembly shown in Figure 1.
Figure 4:
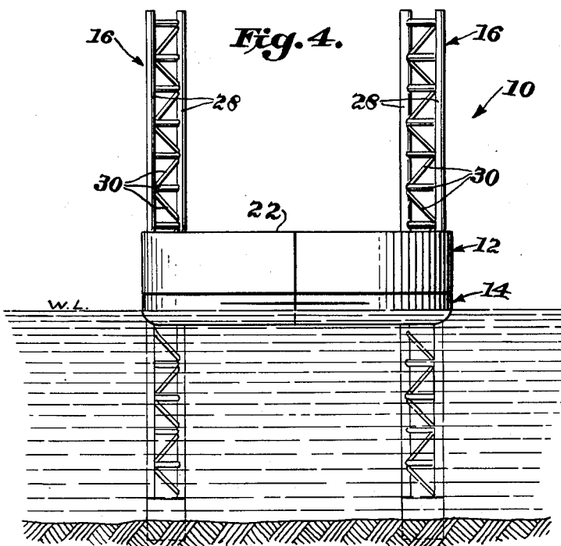
Figure 4 is an end view of the assembly showing the same in its initial position of erection with the supporting legs engaged within the marine bottom.

As best shown in Figure 1, the upper platform 12 may be built up in accordance with conventional ship building practice so as to provide an upper horizontal deck 22. As shown in Figure 3, the deck may be provided with a suitable peripheral railing 24 and other equipment or the like. The upper platform 12 serves as a means for supporting equipment and personnel sufficient to carry on the dry dock operations. For example, the platform 12 may be provided with workshops, machine shops, and the like (not shown) which are necessary in the repair and maintenance of marine craft. In addition, the various installations necessary to maintain personnel may also be built into the platform 12. While this platform may be of bouyant construction, it is preferably made otherwise in view of the expense and weight involved in providing water-tight compartments and the like which are necessary in this regard.

Figures 10, 10A, 10B, 10C:
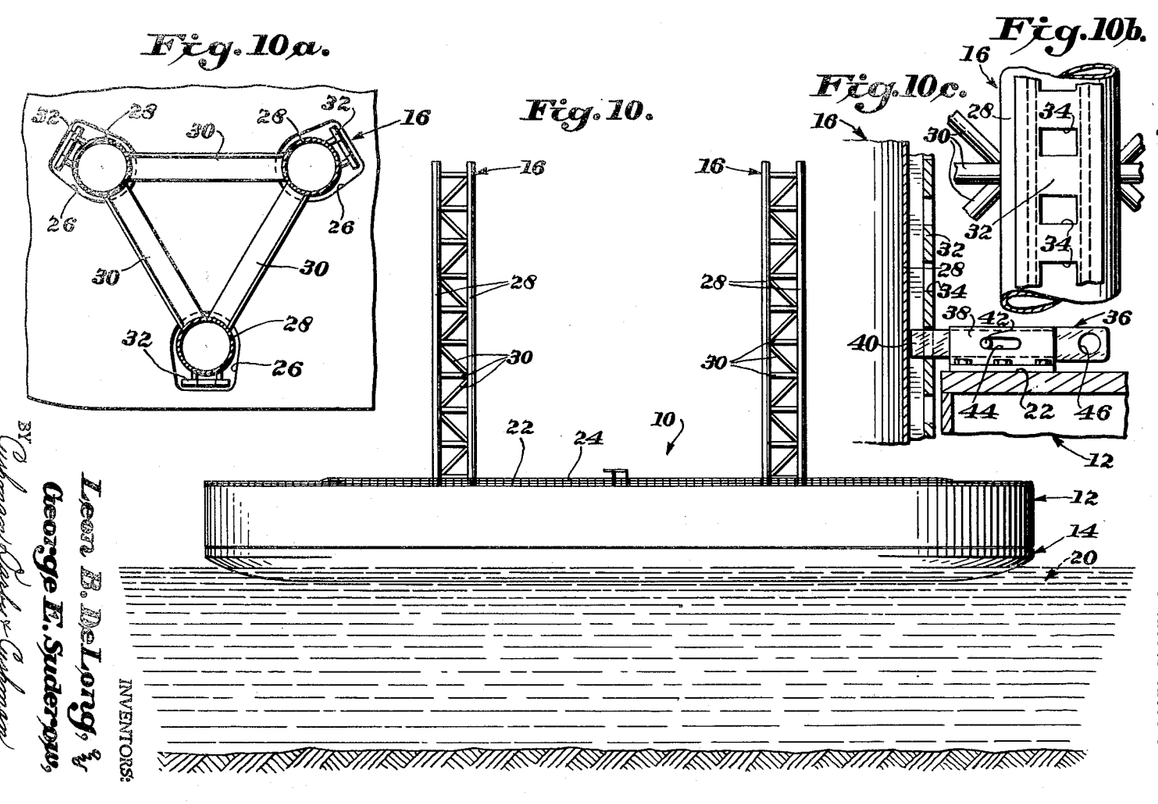
Figure 10 is a side elevational view of the assembly shown in Figure 8.
Figure 10a is an enlarged fragmentary horizontal sectional view showing a supporting leg and the manner in which the same is mounted within the upper platform.
Figure 10b is an enlarged fragmentary side elevational view of a supporting leg.
Figure 10c is an enlarged fragmentary vertical sectional view showing the manner in which the upper platform is located in elevated position on a supporting leg.

The platform 12 is provided with a series of well-like openings 26 arranged along each side thereof for receiving the supporting legs 16. As best shown in Figure 10a, each supporting leg may comprise three elongated tubes or hollow members 28 rigidly maintained in equilateral spaced relation by a plurality of rigid elements 30. Rigidly secured to the outer periphery of each hollow element 28, as by welding or the like, is an elongated channel member 32 having a series of vertically spaced apertures 34 formed therein. The openings in the upper platform are arranged to receive the supporting legs so that the same may have limited lateral movement.

In order to positively lock the upper platform in a desired elevated position above the water level in operation, a locking bolt assembly, generally indicated at 36, is provided on the deck 22 adjacent each of the hollow members 28 of each supporting leg. As best shown in Figure 10c, each assembly 36 includes a guide 38 rigidly secured to the deck of the upper platform and a bolt 40 mounted within the guide for horizontal sliding movement. A pin 42 extends through the central portion of the bolt and has its opposite ends slidably mounted within corresponding elongated slots 44 formed in the guide 38. The outer end of each bolt is apertured, as at 46, so that the same may be manually operated. It will be understood, however, that suitable power means may be provided for actuating the bolts, if desired.

The lower platform is of controllable bouyant construction and preferably includes means for imparting sufficient buoyancy thereto to floatingly support the entire assembly including the upper platform and the supporting legs. To this end, the lower platform includes means (not shown in detail) for permitting the entry of water into the compartments thereof while exhausting air and conversely for evacuating the compartments of water and introducing air therein. One example of such an arrangement is disclosed in the aforesaid Suderow application Serial No. 460,598, which disclosure is hereby incorporated by reference. The lower platform is thus operable to buoyantly support the entire assembly when the same is being transported to a suitable dry dock site and when the assembly is in operative position at such site, it is operable to be controllably submerged under the action of its own weight and suitable ballast contained therein.

To effect relative vertical movement between the platforms and the supporting legs, the lower platform is provided with a corresponding series of well-like openings 48 which are arranged to receive the supporting legs. Surrounding the openings 48 are compartments arranged to receive the jacking mechanisms 18. These jacking mechanisms are preferably constructed in accordance with the disclosure of copending application Serial No. 523,323, filed July 20, 1955, by George E. Suderow. Briefly, each jacking mechanism includes a pair of vertically spaced members mounted for vertical movement with respect to each other in either direction by means of a fluid pressure ram unit or the like. Each member is provided with three horizontally reciprocable locking bolts or pins arranged to be moved into and out of registering supporting leg apertures 34 by a suitable fluid pressure ram unit. In the present installation, the jacking mechanisms are mounted as much as possible within water-tight compartments so that when the lower platform is submerged, the same will be maintained out of contact with the water. For a detailed description of the operation of the jacking mechanism, reference may be had to the above-mentioned Suderow application Serial No. 523,323.

In order to provide means for operating the jacking mechanisms from the upper platform as well as the means for permitting ballast to enter and leave the water-tight compartments of the lower platform, suitable snorkels 49 are provided on the lower platform and extend up through the upper platform. In this manner, the control lines of all the various operating mechanisms contained within the lower platform, which must be operated when the latter is submerged, can be extended to the upper platform for operation therefrom.

In the embodiment of the present invention disclosed in Figures 1–7, the lower platform is made up of separate sections 50. Each section is provided with a graving basin 52 for receiving and supporting marine craft. It will be understood that each graving basin may be provided with means (not shown) for draining the water contained therein before the associated lower platform section has been elevated into its dry dock position. In addition, suitable means (not shown) for supporting the marine craft in the graving basin in the absence of water may also be provided.

Figure 8:
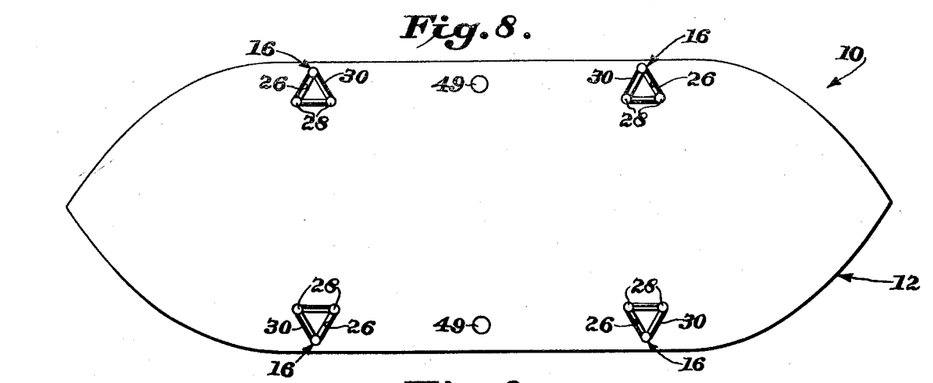
Figure 8 is a top plan view showing a modified form of a mobile marine craft dry dock.
Figure 9:
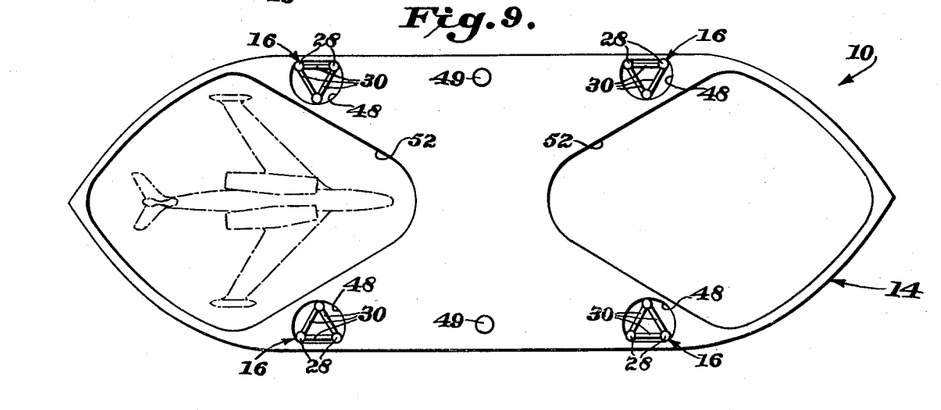
Figure 9 is a horizontal sectional view showing the lower marine craft receiving platform of the assembly shown in Figure 8.

As shown in Figures 8, 9 and 10, the lower platform may be constructed of a single unit rather than in sections as shown in Figures 1–7. The latter arrangement is preferred, however, since separate control of each graving basin can be had with the sectional arrangement. That is, one of the sections may be in its submerged marine craft receiving position while the other section is disposed in its elevated dry dock position and work is being carried out on the craft mounted thereon.

In operation, the platforms are initially disposed in stacked or nested relation and together they define a floating vessel. In this regard, it is to be noted that the compartments of the lower platform are drained of all water ballast and supplied with sufficient air to provide sufficient buoyancy for the entire assembly. With the assembly in its transport position, the propelling unit may be suitably driven to propel the same (as by a diesel engine or the like, not shown, suitably mounted in a water-tight compartment in the lower platform and having exhaust and intake connections through the snorkels 49). It will also be noted that the bottom of the lower platform is given a marine shape so that the assembly can maneuver through water in the same manner as the conventional seagoing vessel. The upper platform, while it may be of buoyant construction, is preferably made as light as possible and, hence, submersible so as to reduce to a minimum the overall weight without sacrificing strength.

With the platforms in their transporting positions and the supporting legs maintained or held in their fully elevated position, as shown in Figures 3 and 10, the entire assembly is transported by means of the propelling unit 20 to a suitable marine site where operations are to be carried on.

Figure 5:
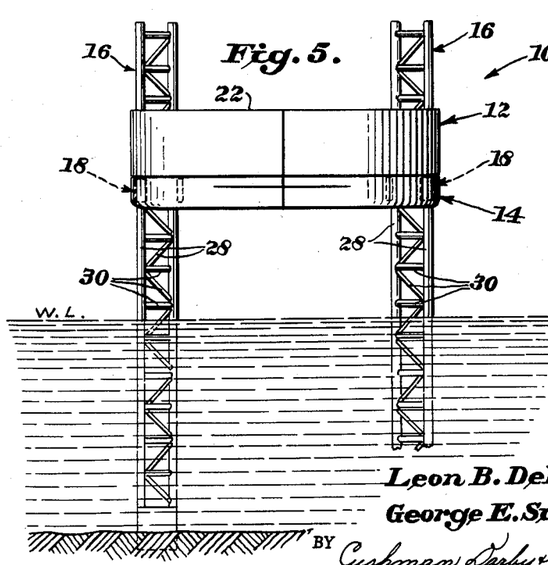
Figure 5 is a view similar to Figure 4 showing the second stage of erection with the pair of platform-like bodies raised above the water level.

When the assembly reaches the marine site, the jacking mechanisms 18 mounted in the lower platform are actuated to permit the supporting legs to move through the platform openings so that the lower ends thereof will engage the marine bottom. Next, the jacking mechanisms are actuated to raise both platforms with respect to the supporting legs until the same are disposed a predetermined height above the water level, as shown in Figure 5. It will be noted that during the initial portion of this operation, the supporting legs will be driven down to a firm foundation in the marine bottom so that the platforms subsequently will be securely maintained in their elevated positions thereabove. After the platforms have been raised to their elevated positions, as shown in Figure 5, the locking bolt assemblies 36 are actuated from the upper platform so as to engage the bolts 40 within registering apertures 34 of the supporting legs. In this manner, the upper platform is maintained in its elevated position on the supporting legs by a mechanical locking action.

Figure 2:
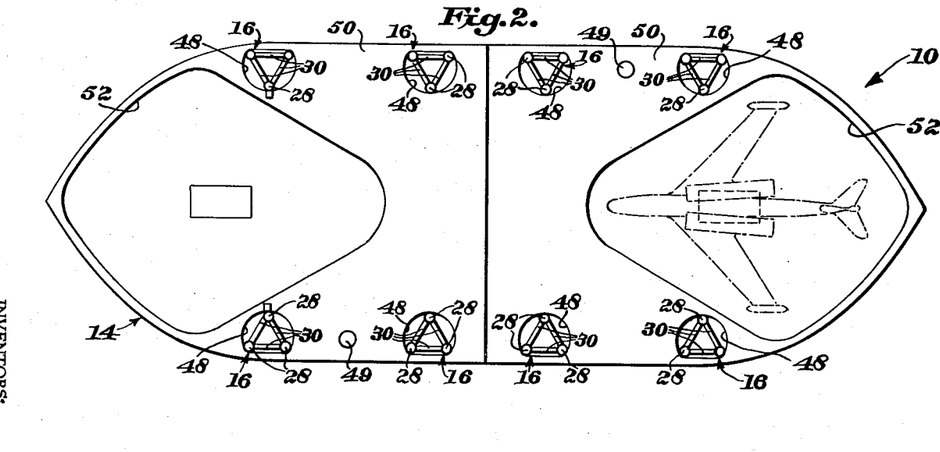
Figure 2 is a horizontal sectional view illustrating the marine craft receiving platform of the assembly.
Figure 6:
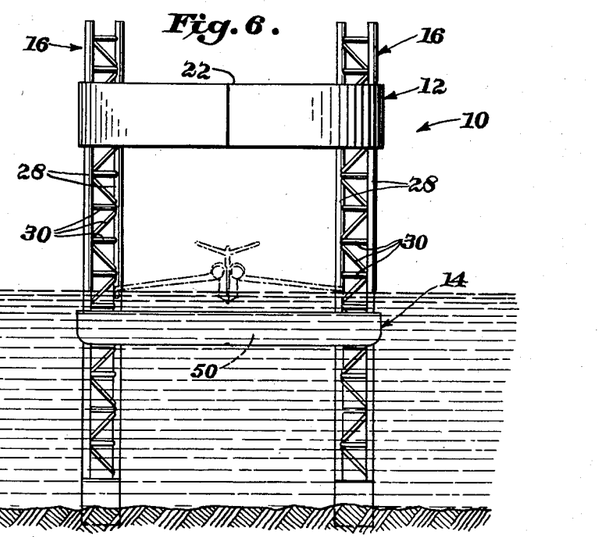
Figure 6 is a view similar to Figure 4 showing the assembly in a third stage of erection with the lower platform in its marine craft receiving position.
Figure 7:
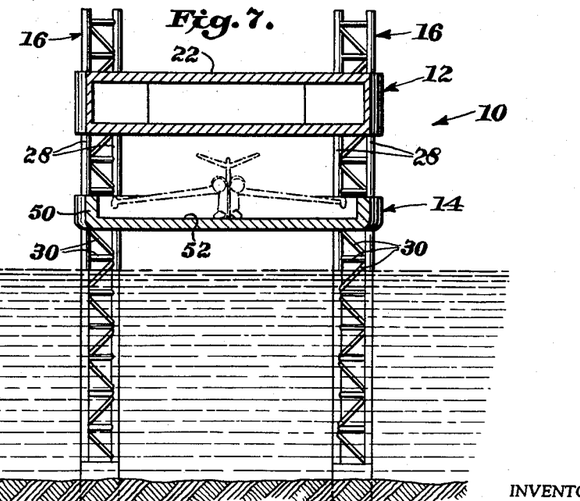
Figure 7 is a transverse sectional view showing the assembly in its fourth stage of operation with the lower platform raised to its dry dock position.

When the upper platform positively locked in its elevated position, the lower platform may be lowered with respect to the supporting legs, by the operation of the jacking mechanisms 18, until the same engages the surface of the water and is floating thereon. Next, the ballast control valves of the lower platforms are actuated in the manner indicated in the aforesaid Suderow application Serial No. 460,598. This operation permits the lower platform to submerge beneath the surface of the water. The jacking mechanisms 18 are utilized during this operation to control the descent of the lower platform into a suitable submerged position for receiving marine craft, such as shown in Figure 6. As the lower platform or each section thereof is submerged, the graving basin will become filled with water so that a marine craft can be floated into a position thereabove. Next, the ballast control valves are actuated to reverse the above operation and cause the lower platform or each section thereof to raise relative to the supporting legs. The ascent of the lower platform is controlled by the operation of the jacking mechanism until such time as the lower platform is fully floating on the surface of the water. Subsequently, the jacking mechanisms are operated to effect raising of the platform with the marine vessels contained within the graving basins to a suitable elevation above the surface of the water. This position is clearly illustrated in Figure 7, and it will be noted that ready access to the marine craft is provided by the lower platform. As shown in Figure 2, the lower platform provides, in addition to the graving basins, a suitable work area whereby the graving operations may be performed.

As was indicated above, in the operation of the sectional lower platform disclosed in Figures 1–7, each lower platform section may be raised and lowered independently of the other section and this flexibility is advantageous over the single unit construction illustrated in Figures 8–10.

A significant feature of the present invention resides in the provision of an assembly operable in the manner described above which can be quickly and easily converted from its operative position back to its transporting position and moved to another marine site where additional graving operations can be carried on. To effect the conversion of the assembly from its operative position to its transport position, the lower body or each section thereof is submerged and all marine craft floated out of overlying relation therefrom. Next, the lower body or each section thereof is raised until the same is disposed under the upper body in supporting relation thereto. The locking bolt assemblies 36 of the upper body are released and the two bodies are lowered as a unit on the supporting legs by the operation of the jacking mechanism until they are floating on the surface of the water. Next, utilizing the buoyancy of the floating unit to take the reaction, the supporting legs are pulled up by the operation of the jacking mechanisms until they are free from the marine bottom and disposed in their upper transport position on the vessel. The assembly is then ready for self-transportation to another marine site for operations therein in a similar manner.

Referring now more particularly to Figures 11–15, there is shown a modified form of a mobile marine craft dry dock assembly embodying the principles of the present invention. The assembly illustrated in this embodiment more closely resembles the assembly such as described in the aforementioned Suderow application Serial No. 460,598. The essential difference between an assembly such as described in the Suderow application and the present assembly is that the latter includes a lower platform provided with means for receiving and supporting a marine craft and is adapted to be elevated to a dry dock position above the surface of the water. In the Suderow application a lower platform is provided which is capable of vertical movement with respect to the supporting legs, but this platform is disclosed as being submersible merely to stabilize and strengthen the legs supporting the upper platform.

Figure 11:
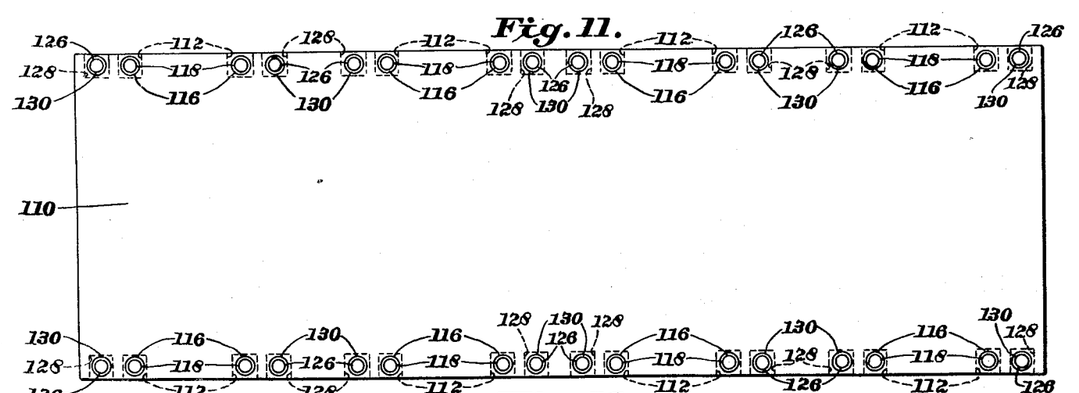
Figure 11 is a plan view of still another form of a mobile marine craft dry dock initially embodying the principles of the present invention.
Figure 12:
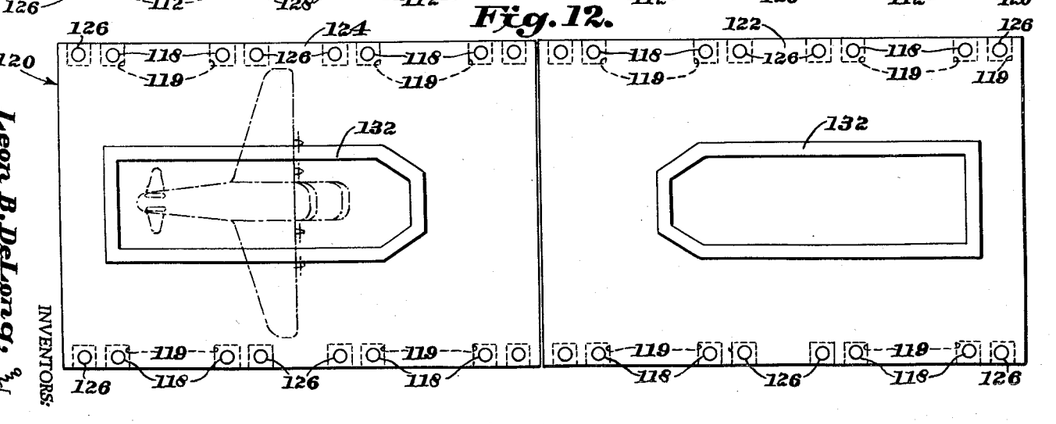
Figure 12 is a horizontal sectional view of the assembly of Figure 11 showing the marine craft receiving platform of the same.

As best shown in Figure 11, the assembly includes the upper platform 110 which is of buoyant construction. Preferably, the upper platform is constructed in accordance with the teachings of copending application Serial No. 283,567, filed April 22, 1952, by Robert W. Pointer, which issued on January 1, 1957, as Patent No. 2,775,869. As disclosed in the aforementioned application, such platform includes a plurality of well-like openings 112 having annular horizontal upper surfaces 114 surrounding the same. Disposed on each surface 114 is a jacking mechanism 116, preferably of the type disclosed in the Pointer patent. A tubular leg 118 is arranged to extend through each opening 112 and jacking mechanism 116 for substantial relative vertical movement with respect to the platform.

Figure 13:
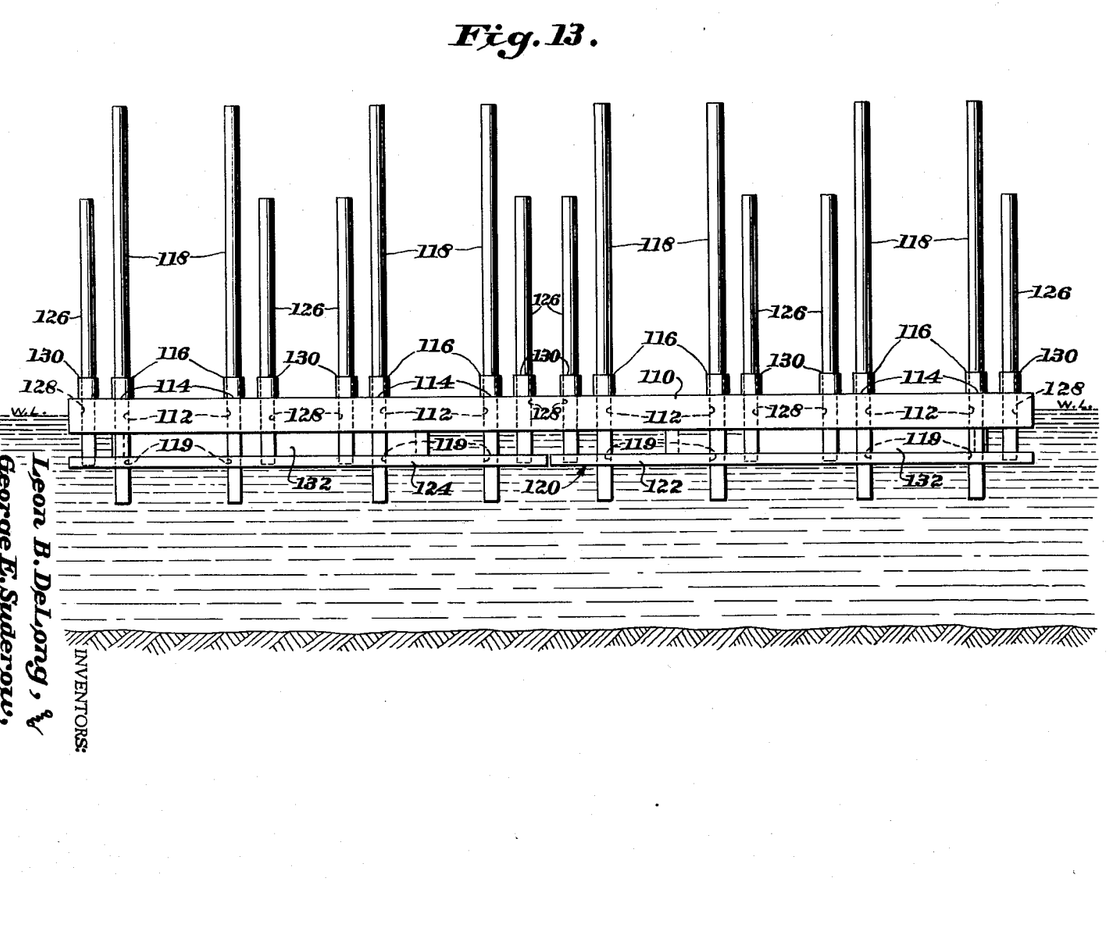
Figure 13 is a side elevational view of the assembly in Figure 11.

The supporting legs 118 are also arranged to extend through suitable well-like openings 119 formed in a lower platform 120. As shown in Figure 13, the lower platform 120 includes two sections 122 and 124. The lower platform sections are preferably non-buoyant although they may be, if desired, made selectively buoyant or submersible by an arrangement such as disclosed in the aforesaid Suderow application Serial No. 460,598.

Each lower platform section is provided with a series of elongated tubular elements 126 having their lower ends suitably rigidly secured to the lower platform sections. The tubular elements 126 extend upwardly through well-like openings 128 provided in the upper platform adjacent the openings 112. As before, a jacking mechanism 130, similar to the jacking mechanisms 116, is provided on the upper platform surface for each of the tubular elements 126. Each lower platform section is provided with walls 132 defining a graving basin arranged to receive and support marine craft during the operation of the assembly.

Figure 14:
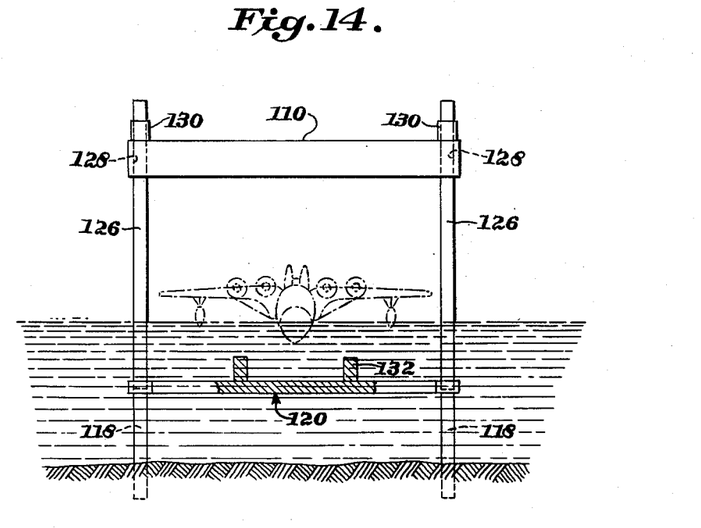
Figure 14 is an end view of the assembly shown in Figure 11 with the lower platform disposed in its marine craft receiving position.
Figure 15:
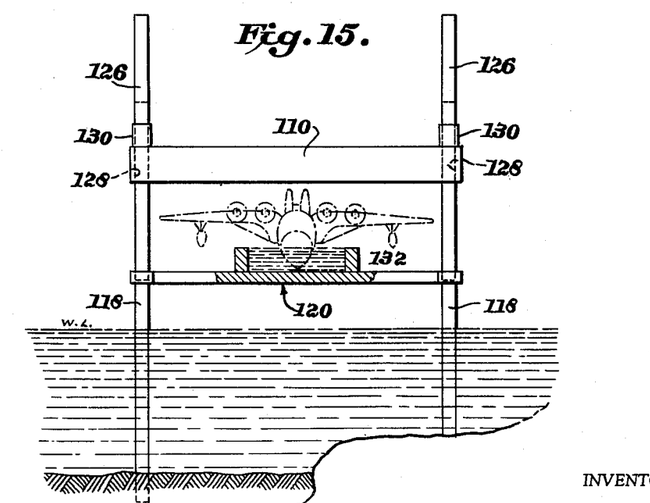
Figure 15 is a view similar to Figure 14 showing the lower platform in its raised dry dock position.

The assembly of Figures 11–15 is floated to a suitable marine site with the platforms in the position indicated in Figure 13. That is, the supporting legs 118 are maintained in their uppermost position by the jacking mechanisms 116 and the lower platform sections are maintained in their uppermost position with respect to the upper platform by engagement of jacking mechanisms 130 with the tubular elements 126. It will be understood that since the upper platform is sufficiently buoyant to support both platforms, the entire assembly can be transported to the marine site by the use of tugs or the like. When the assembly reaches the marine site, the supporting legs 118 are lowered by the operation of the jacking mechanisms 116, in the manner described in the aforesaid Pointer application, until the lower ends thereof engage the marine bottom. The supporting legs 118 are firmly embedded in the marine bottom so as to effect a substantial support for both platforms. The jacking mechanisms 116 are operable to raise and lower the upper platform with respect to the embedded supporting legs 118 while the jacking mechanisms 130 are operable to effect a relative vertical movement between the upper platform and the lower platform. Consequently, either by simultaneously operating the jacking mechanisms 130 and 116 or by independent operation thereof, the upper platform can be raised on the supporting legs 118 to a desired position above the water level, as shown in Figure 14, and each lower platform section may be lowered relative to the upper platform to a submerged position, as shown in Figure 14, for receiving marine craft. After the craft has been positioned above the lower platform section, the latter may be raised by the jacking mechanisms 130 until the marine craft carried thereby is elevated to a desired height above the water level, as indicated in Figure 15. In this position, the graving operations, as well as other maintenance and repair operations, can be conveniently carried on by operators working from the lower platform section. The various work shops and machine shops and the like (not shown) necessary to carry on the graving and other operations are preferably built into the upper platform which is not submerged in the normal operation of the assembly. The above procedure is reversed to permit the assembly to be moved to a new marine site.

Preferably, the lower ends of the tubular elements 126 are releasably fixed to the lower platform section, as by power-operated locking assemblies such as the locking assemblies 36 previously described, so that they may be selectively removed therefrom by the jacking mechanisms 130. This releasable feature of the tubular elements permits seaplanes having a wing span greater than the distance between the corresponding tubular elements or supporting legs on opposite sides of the platform to be received in the graving basin. Thus, when a seaplane of this type is to be received by the lower platform, the first two tubular elements and the adjacent two supporting legs are withdrawn by the operation of their jacking mechanisms 118 and 130. The plane is then moved inwardly of the lower platform section and the tubular elements and supporting legs replaced in their normal operative position. Next, the proceeding two tubular elements and supporting legs are raised clear of the lower platform section and lower surface of the upper platform so as to permit the seaplane to be moved into the graving basin. Then, the tubular elements and supporting legs may be lowered to their operative positions. After all of the tubular elements and supporting legs are in their operative positions, the jacking mechanisms 130 may be operated to raise the lower platform section and, hence, the seaplane to an elevated position above the water level where suitable repair operations can be performed in the manner set forth above.

It thus will be seen that the objects of this invention have been fully and effectively accomplished. It will be realized, however, that the foregoing specific embodiment has been shown and described only for the purpose of illustrating the principles of this invention and is subject to extensive change without departure from such principles. Therefore, this invention includes all modifications encompassed within the spirit and scope of the following claims.

We claim:

1. A mobile dry dock for marine craft comprising: upper and lower platform-like bodies together defining a buoyant vessel floatable to a marine site; a plurality of substantially upright body-supporting legs; guide means on said bodies mounting said legs for projection above and below each body and for substantially vertical movement relative thereto; means mounted to one of said bodies for raising and lowering said legs relative to said vessel when the latter is afloat and for raising and lowering said bodies on said legs when the latter are in supporting engagement with the marine bottom; means mounted to said upper body for maintaining the same in an elevated position above the water level on said legs when said upper body has been raised to such position; and means on said lower body for receiving and supporting a marine craft, said lower body including at least two sections each being submersible and independently vertically movable in either direction on said legs while said upper body is maintained in said elevated position, whereby each of said sections, when submerged, can receive marine craft floated thereover and raise the craft to a dry dock position at a desired height above the water level.

2. The combination as defined in claim 1 wherein said raising and lowering means comprises jacking mechanisms mounted on the lower body and engageable with said body supporting legs to raise and lower the lower body to thereby lift and lower the upper body with the lower body, and wherein the maintaining means comprises locking assemblies mounted on said upper body for engaging said legs.

3. The combination as defined in claim 1 wherein the upper body is buoyant and the lower body is submersible.

4. The combination as defined in claim 1 wherein the lower body is controllably buoyant so as to either floatingly support the entire assembly or be submerged so as to receive the marine craft.

5. The combination as defined in claim 1 wherein said lower body is provided with means for propelling both bodies to the marine site when together.

6. The combination as defined in claim 1 wherein the lower exterior surface of the lower of said bodies is formed into a marine shape suitable to permit the bodies together to navigate water in the conventional manner.

7. The method of tending marine craft at a desired marine site, the steps comprising: floating to the site as a vertically stacked unit an upper platform-like body carrying repair and maintenance equipment and a lower marine craft-receiving body; lowering a series of supporting legs relative to both bodies until the lower ends thereof are supported by the marine bottom at the site; raising the upper body on the marine-bottom-supported legs to a desired height above the water level and supporting it on the legs at such height; controllably submerging the lower body on the marine-bottom-supported supporting legs to a marine craft-receiving position below the water level; floating a marine craft over the lower body with the latter disposed in said receiving position; and then raising the lower body on the marine-bottom-supported legs from said receiving position to a position above water to thereby lift the craft into a dry dock position.

8. The method defined in claim 7 in which the steps of raising and supporting the upper body are accomplished by lifting it with the lower body and then locking it to the legs.

9. The method of tending marine craft at a desired marine site, the steps comprising: floating to the site as a vertically stacked unit an upper platform-like body carrying repair and maintenance equipment and a lower marine craft-receiving body, at least one of which is buoyant; driving a series of supporting legs through both of said bodies until the lower ends thereof are firmly embedded in the marine bottom at the site; raising the upper body on the marine-bottom-embedded legs to a desired height above the water level; maintaining said upper body in its position above the water level on said legs; controllably submerging the lower body on the marine-bottom-embedded supporting legs, while said upper body is maintained in its position above the water level, to a marine craft-receiving position below the water level; floating a marine craft over the lower body while the same is in said receiving position; and raising the lower body on the marine-bottom-embedded supporting legs from said receiving position until the craft is supported thereby and the supported craft is elevated to a desired height intermediate the water level and the position of said upper body above the same.

10. A mobile dry dock for marine craft comprising: upper and lower platform-like bodies, said upper body being nonbuoyant and carrying repair and maintenance equipment and said lower body being controllably buoyant and submersible, said bodies being adapted to be disposed in stacked relation with said lower body supporting said upper body and together defining a buoyant vessel floatable to a marine site and thereat said bodies being adapted to be movable vertically relative to each other; a plurality of substantially upright body-supporting legs; guide means on said bodies mounting said legs for projection above and below each of said bodies and for substantially vertical movement relative thereto; power-operated means mounted to said lower body and engageable with said legs for moving the latter down into engagement with a marine bottom and thereafter raising or lowering said lower body, together with said upper body, on said legs; means on said upper body for supporting the latter on said legs independently of said lower body; and means on said lower body for receiving and supporting a marine craft, whereby at a selected marine site said legs can be moved down into engagement with the marine bottom by said power-operated means, the latter operated to lift both of said bodies out of the water on said legs, said upper body supported at an elevated position out of the water on said legs, said lower body lowered on said legs and submerged so as to permit a marine craft to be floated thereover, and thereafter said lower body raised on said legs to lift the marine craft into a dry dock position out of the water.

11. The structure defined in claim 10 wherein the lower body is formed in at least two sections each having means for supporting a marine craft and both independently submersible and raisable on the legs while the upper body is supported in the elevated position on the legs.

12. The structure defined in claim 10 including controls for the power-operated means carried by the upper body.

References Cited in the file of this patent

UNITED STATES PATENTS

| | | |
|---|---|---|
| 1,718,006 | Reno | June 18, 1929 |
| 2,375,286 | Creed | May 8, 1945 |
| 2,381,789 | Turnbull | Aug. 7, 1945 |
| 2,691,272 | Townsend et al. | Oct. 12, 1954 |
| 2,771,747 | Rechtin | Nov. 27, 1956 |

FOREIGN PATENTS

| | | |
|---|---|---|
| 426,814 | Germany | Mar. 18, 1926 |
| 607,826 | Great Britain | Sept. 6, 1948 |
| 515,208 | Belgium | Nov. 14, 1952 |